No. 644,070. Patented Feb. 27, 1900.
C. H. FOSTER.
GEARING.
(Application filed May 12, 1899.)
(No Model.)

Witnesses:
Geo. B. Marty
B. Srp.

Inventor:
C. H. Foster
By Boulder, Holding & Masten
his attorneys

UNITED STATES PATENT OFFICE.

CLAUDE H. FOSTER, OF CLEVELAND, OHIO.

GEARING.

SPECIFICATION forming part of Letters Patent No. 644,070, dated February 27, 1900.

Application filed May 12, 1899. Serial No. 716,609. (No model.)

*To all whom it may concern:*

Be it known that I, CLAUDE H. FOSTER, a citizen of the United States, residing at Cleveland, county of Cuyahoga, and State of Ohio, have invented certain new and useful Improvements in Gearing; and I hereby declare the following to be a full, clear, and exact description of the invention, such as will enable others skilled in the art to which it appertains to make and use the same.

My invention relates to that class of gearing in which balls take the place of teeth; and its object is to provide a gear that will transmit motion with a minimum amount of friction.

It consists in substituting for the tooth of ordinary gear-wheels balls so mounted in the gear that they may revolve in any direction without friction and in the specific mechanism for retaining and adjusting the balls.

I am aware that balls have heretofore been used as a substitute for teeth in gearing; but the method of fastening or mounting them in the gear is so uniformly inadequate that the friction between the ball and the body of the gear in which it is mounted is greater than that between the ball and the tooth of the gear meshing with it. The balls, therefore, fail to revolve, and this, it will be seen, defeats the purpose of the ball-tooth. This difficulty is overcome by mounting the balls between ball-races on the opposite sides of an annular groove in the body of the gear with suitable adjusting mechanism, as herein shown. This permits the balls to revolve in the direction of the motion of the meshing tooth, the groove being of such size as to permit the teeth of the meshing gear to engage the balls.

The invention may be used either in wheels on parallel axis or in wheels which are on variously-inclined axes.

The accompanying drawings represent what I consider the best means for carrying out the invention.

Figure 1:
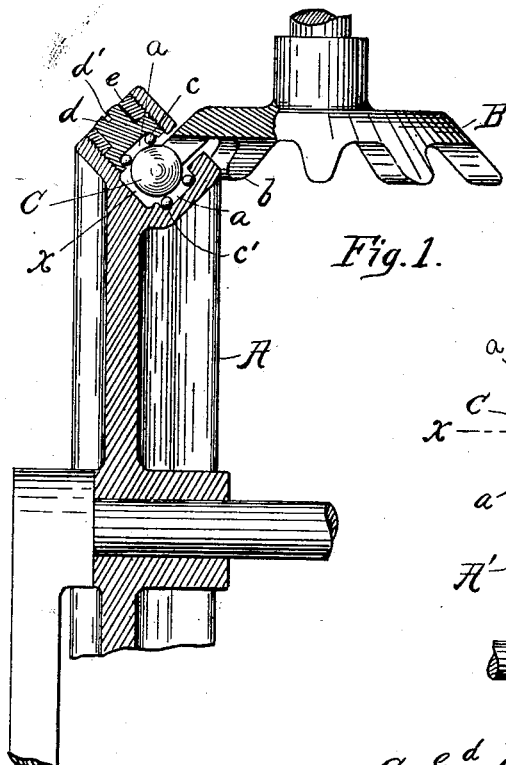
Figure 2:
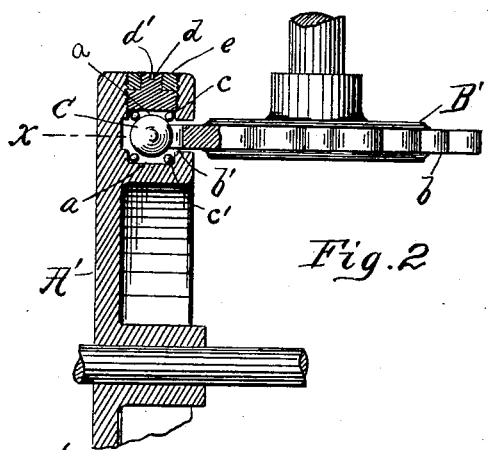
Figure 3:
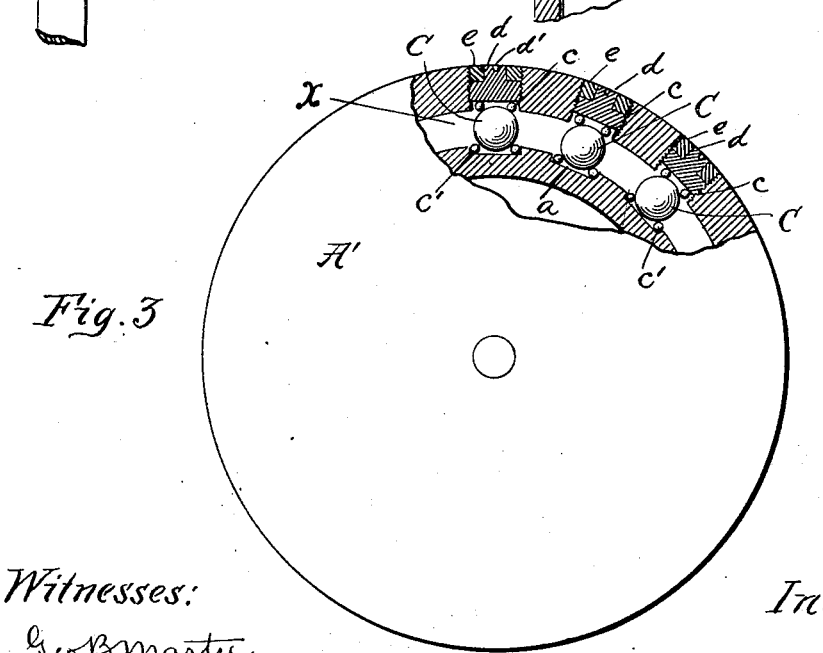

Figure 1 is an elevation, partly in section, of a pair of bevel-gears with my improvement. Fig. 2 is another form of the same. Fig. 3 is an end view, partly in section, of the body of the gear A' in Fig. 2.

Like letters represent like parts in all of the figures.

Referring to Fig. 1, A is the body of the gear, which carries the ball-teeth. B is another gear, the teeth of which mesh with the ball-teeth of the gear A.

X is an annular groove in the body of the gear A.

C C C are the ball-teeth mounted in the annular groove X upon the smaller balls $c\ c'$ in the opposed ball-races $a$.

In the outer rim of the gear A are threaded openings into which the plugs $d$ and the lock-nuts $e$ are screwed. The inner end of the plugs $d$ form the outer ball-races, and the outer end has the slot $d'$ for adjusting the plug. The inner ball-races are sunk into the body of the gear.

Having described my invention, I claim—

In a gear-wheel, the combination, with a body having spherical contact elements mounted in an annular groove, and series of opposed ball-bearings, of adjustable screw-threaded plugs forming the outer ball-races of said bearings, and lock-nuts for said plugs, substantially as described.

In testimony whereof I have hereunto affixed my signature in the presence of two witnesses.

C. H. FOSTER.

Witnesses:
GEO. B. MARTY,
B. SIP.